United States Patent
Suzuki

[19]
[11] Patent Number: 5,945,200
[45] Date of Patent: Aug. 31, 1999

[54] MOLDED PLASTIC PRODUCT WITH PAD AND METHOD OF MANUFACTURING SAME

[75] Inventor: Hiroshi Suzuki, Anjo, Japan

[73] Assignee: Kabushiki Kaisha Inoac Corporation, Aichi-ken, Japan

[21] Appl. No.: 08/863,073

[22] Filed: May 23, 1997

[51] Int. Cl.[6] .............. B32B 23/02; B32B 3/00; B28B 5/00

[52] U.S. Cl. .............. 428/192; 428/71; 428/158; 428/161; 428/172; 428/213; 264/45.1; 264/45.5; 264/46.5; 264/241

[58] Field of Search .................. 428/172, 192, 428/167, 158, 72, 76, 71, 83, 161, 213, 318.8; 264/241, 45.1, 45.5, 46.4, 46.5, 267

[56] References Cited

U.S. PATENT DOCUMENTS

| | | | |
|---|---|---|---|
| 4,725,471 | 2/1988 | Imhott | 428/72 |
| 4,892,770 | 1/1990 | Labric | 428/71 |
| 5,418,028 | 5/1995 | DeWitt | 428/71 |

FOREIGN PATENT DOCUMENTS

| | | |
|---|---|---|
| 61-193813 | 8/1986 | Japan . |
| 01200917 | 8/1989 | Japan . |
| 1-200917 | 8/1989 | Japan . |
| 5-45408 | 7/1993 | Japan . |

*Primary Examiner*—Donald Loney
*Attorney, Agent, or Firm*—Armstrong, Westerman, Hattori, McLeland & Naughton

[57] ABSTRACT

A molded plastic product has a pad and a core. The pad is made of plastic foam and a skin that covers the surface and side face of the plastic foam. The core has a pad housing for accommodating the pad. A groove is formed partly or entirely along the side face of the skin. The plastic foam bonds the pad and core together. The groove prevents the plastic foam from leaking onto the surface of the skin and provides a function of firmly holding the skin.

11 Claims, 8 Drawing Sheets

MOLDED PLASTIC PRODUCT WITH PAD AND METHOD OF MANUFACTURING SAME

BACKGROUND OF THE INVENTION

1. Field of the Invention

The present invention relates to a molded plastic product with a pad and a method of manufacturing the same.

2. Description of the Related Art

Molded plastic products having pads are used for various purposes including car interior parts and furniture. The molded plastic product consists of a core and a pad attached to the surface of the core. The pad consists of plastic foam having a given shape and a skin adhering to the plastic foam.

Figure 13:
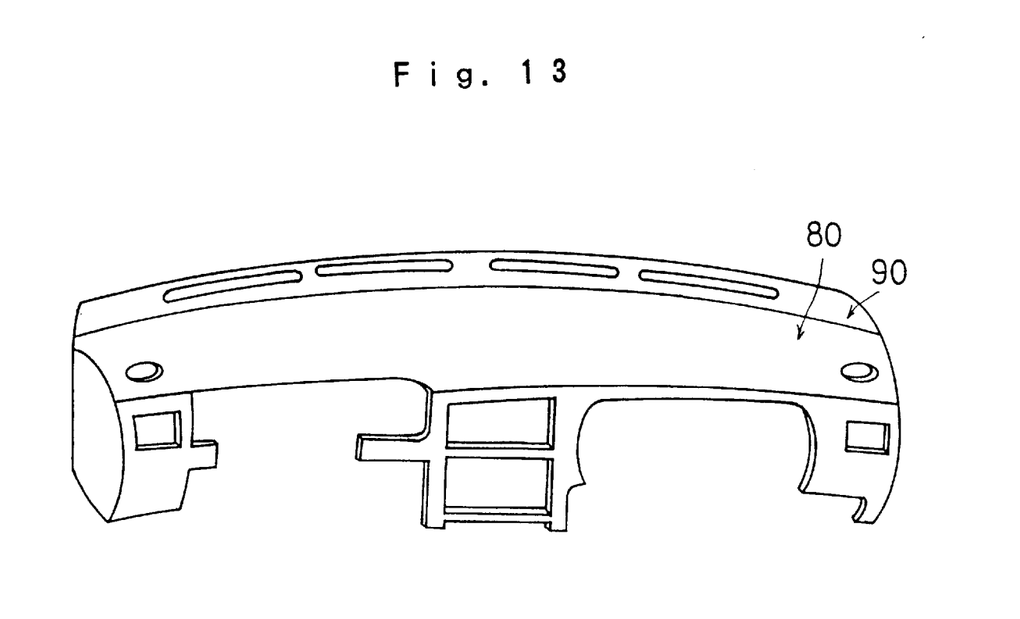
FIG. 13 is a perspective view showing an example of a molded plastic product with a pad.

FIG. 13 shows a car instrument panel as an example of the molded plastic products. The panel is made of a pad 80 and a core 90. The pad 80 is attached to a part of the surface of the core 90. Some products have a pad that entirely covers the surface of a core.

Figure 14:
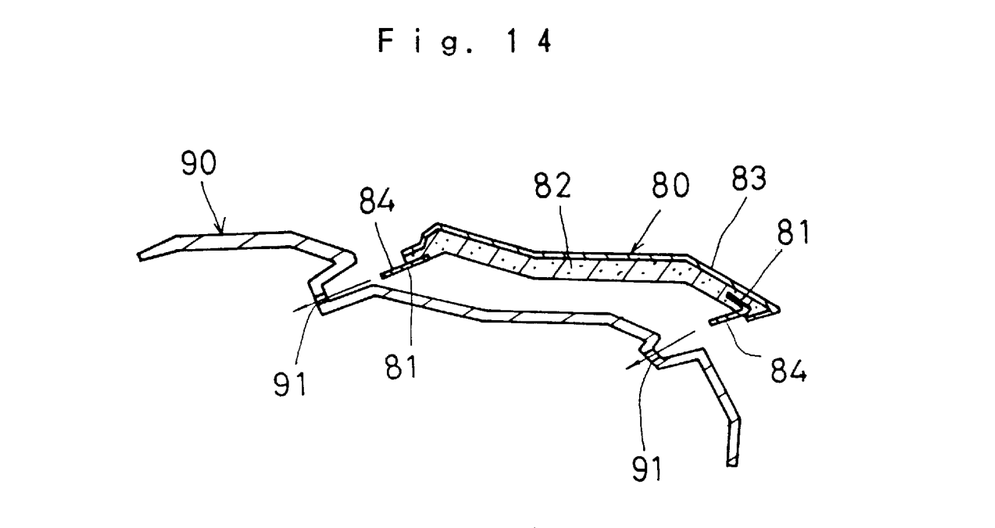
FIG. 14 is a sectional view showing a pad to be assembled with a core according to a prior art.

FIG. 14 shows a molded plastic product having a pad according to a prior art. The pad 80 is composed of metal inserts 81, plastic foam 82, and a skin 83. The pad 80 is attached to the surface of a core 90 in an afterprocess. Each insert 81 has a pin 84, which is inserted into a hole 91 of the core 90 and is bent or fastened with a clip or screw.

This prior art involves many processes because it must form the pad 80 first and then attach it to the core 90 in a separate process. Since the prior art employs the pins 84 to fix the pad 80 to the core 90, a gap is easily formed between the pad 80 and the core 90, to spoil the external appearance of the product. In addition, the metal inserts 81 make the product heavier.

Figure 15:
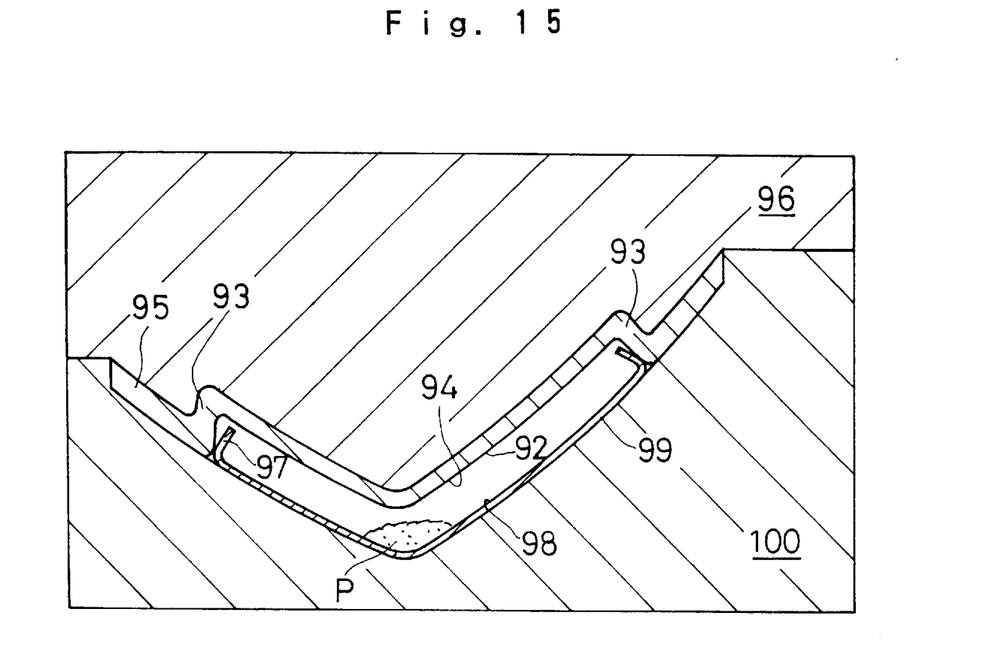
FIG. 15 is a sectional view showing the manufacturing of a molded plastic product with a pad according to a prior art.

To solve this problem, a monolithic molding technique of FIG. 15 has been proposed. This technique molds a pad, and at the same time, integrates the pad with a core 95. The core 95 has a pad supporting face 92, a sidewall 93 surrounding the supporting face 92, and a pad housing 94. The core 95 is set on an upper mold 96. A skin 99 of the pad has a side face 97, which is fitted to the pad housing 94, and a back face 98. The skin 99 is set on a bottom mold 100 so that the back face 98 faces the pad supporting face 92. Foam ingredients P like urethane precursors produces foam between the core 95 and the skin 99, to integrate them into one body.

Figure 16:
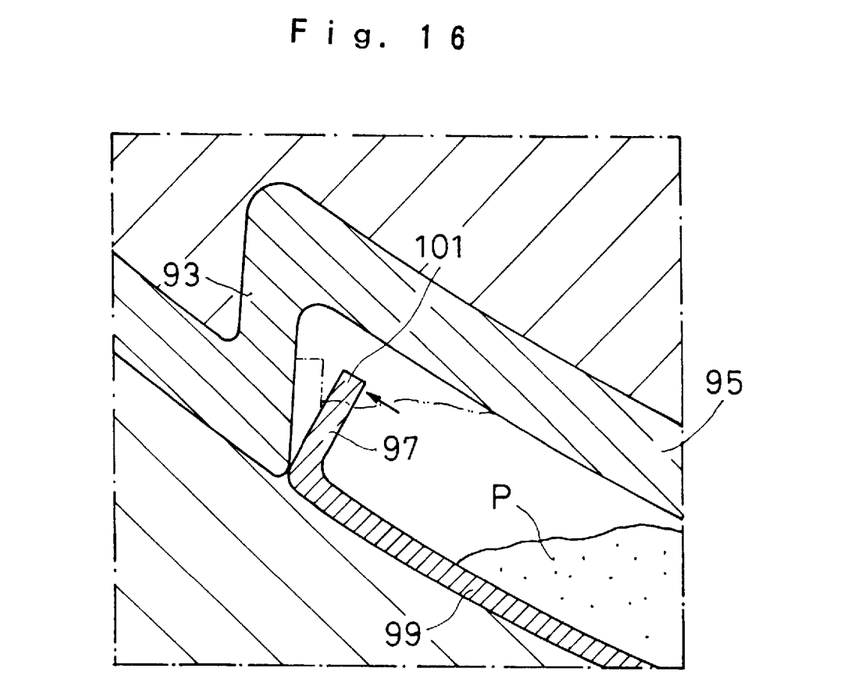
FIG. 16 is an enlarged section showing an essential part of FIG. 15 with foam ingredients rising.

In FIG. 16, the foam produced by the foam ingredients P fills a space between the core 95 and the skin 99. At this time, the pressure generated and increased by rising of the foam ingredients presses the side face 97 of the skin 99 against the sidewall 93 of the core 95, thereby preventing the foam from oozing onto the surface of the skin 99. The tightly fitted sidewall 93 and side face 97 provide the product with a good appearance. The product has no metal inserts, and therefore, is light. In this way, this technique has several advantages. The foam, skin, and core are solidified together due to the self-adhesive property of the foam ingredients.

Figure 17:
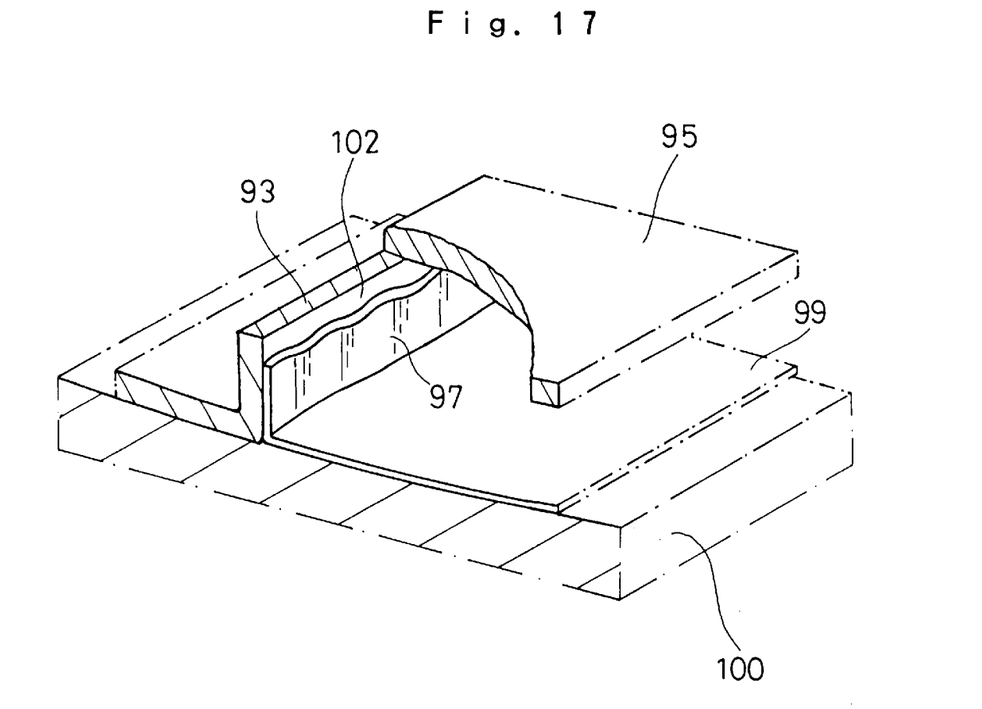
FIG. 17 is a partly broken perspective view showing a skin with a deformed side face according to the prior art.

This prior art, however, has some problems. The side face 97 of the skin 99 has low rigidity because of a free end 101. The side face 97 is easily deformed or corrugated during storage or on the bottom mold 100. Once the side face 97 is deformed, it causes a gap 102 with respect to the sidewall 93 as shown in FIG. 17. Then, the foam ingredients P may ooze onto the surface of the skin 99, to spoil the appearance of the product or cause unfilled spots in the pad. The deformed side face 97 will not restore to an original shape even if the skin 99 is heated. This problem is difficult to solve.

Powder slush molding is easy to control thickness of a skin. This technique may be employed to thicken the side face of a skin and improve the rigidity thereof. This technique forms a skin on the inner face of a slush mold and takes off the skin from the mold by pulling a free end of the side face of the skin. At this time, the side face is easily corrugated. Accordingly, this technique is insufficient to prevent a deformation of the side face of the skin.

When molding a large plastic product such as an instrument panel having a pad, depending on the position of injecting foam ingredients with respect to the large product, or because a gap between a core and a skin of the product is not uniform, the foam ingredients can flow irregularly to unevenly press the side face of the skin against the sidewall of the core. This results in collecting to pressure generated and increased by rising of the foam ingredients to the gap and leaking the foam ingredients through the gap onto the surface of the skin.

There is another problem that the quality of the skin deteriorates during use and the skin shrinks to peel the side face of the skin off the foam.

SUMMARY OF THE INVENTION

An object of the present invention is to provide a molded plastic product having a pad with a skin on a core. The skin is provided with a rigid side face to prevent a deformation of the side face, completely seal the side face, and stop plastic foam from leaking through the side face onto the surface of the skin even if the plastic foam penetrates between the side face of the skin and the core. Consequently, the product maintains quality and appearance.

Another object of the present invention is to provide a method of manufacturing such a molded plastic product.

In order to accomplish the objects, the present invention provides a molded plastic product having a pad with a skin and a core. The pad is made of plastic foam and the skin that covers the surface and side face of the plastic foam. The core has a pad housing for accommodating the pad. A groove is formed partly or entirely along the side face of the skin, which faces the sidewall of the pad housing. The groove is dented from the surface of the side face toward the back face thereof. The plastic foam bonds the pad and core together.

The present invention also provides a method of manufacturing a molded plastic product. The method includes the steps of preparing a core having a pad supporting face, a sidewall surrounding the supporting face, and a pad housing defined by the supporting face and sidewall and dented from the surface of the core toward the back face thereof, preparing a skin having a side face to be fitted to the sidewall of the core, setting the core on an upper mold so that the pad supporting face is oriented toward a lower mold, setting the skin on the lower mold so that the back face of the skin is oriented toward the pad supporting face of the core, and rising a foam ingredients between the pad supporting face of the core and the back face of the skin, to bond the skin and core into one body through the foam ingredients. The method is characterized by forming a groove partly or entirely along the side face of the skin by denting the surface of the side face toward the back face thereof.

It is preferable to make the walls of the groove thicker than the other part of the skin. It is preferable to form a groove partly or entirely along the sidewall of the pad housing of the core. It is preferable to penetrate the pad housing of the core through holes on the groove.

The groove formed along the side face of the skin improves the rigidity of the side face. As a result, the side face is not deformed or corrugated during storage or on the lower mold. The skin may be formed by sol or powder slush molding. In this case, the skin is formed on the inner face of a slush mold and is removed from the mold by pulling the side face of the skin. Since the rigidity of the side face is improved due to the groove, the side face is hardly stretched or corrugated when it is pulled.

As a result, the skin causes no gap with respect to the sidewall of the core when forming the product. Namely, the side face of the skin provides proper sealing.

When forming the skin by slush molding, the groove protrudes from the back face of the skin. As a result, the base of the groove collects molten plastic material. Accordingly, the groove become thick. This results in improving the rigidity of the side face, thereby preventing a deformation of the side face and realizing a good seal.

Even if plastic foam filling a space between the skin and the core penetrates between the side face of the skin and the sidewall of the core due to the pressure generated and increased by rising of the foam ingredients or uneven flow of the foam, the groove on the side face of the skin receives the penetrating foam to prevent it from oozing over the surface of the skin.

The groove on the sidewall of the core also receives the penetrating foam to prevent the foam from oozing over the surface of the skin even if the quantity of the penetrating foam is large.

The foam entered into the groove of the core and the foam inside the skin bond and sandwich the side face fixes the side face of the skin to the sidewall of the core. This prevents the side face of the skin from peeling off even if the skin shrinks during use, thereby securing a good appearance of the product for a long time.

The through holes on the groove of the core release pressure when the foam penetrates between the sidewall of the core and the side face of the skin. This results in surely guiding the penetrating foam into the groove of the core, thereby surely preventing the penetrating foam from oozing onto the surface of the skin.

If the quantity of the penetrating foam is larger than the capacities of the grooves of the core and skin, the excess foam passes through the through holes toward the back side of the core. As a result, the penetrating foam never stains the surface of the skin.

BRIEF DESCRIPTION OF THE DRAWINGS

Other objects and features of the present invention will be described hereinafter in detail by way of preferred embodiments with reference to the accompanying drawings, in which.

DESCRIPTION OF THE PREFERRED EMBODIMENTS

Figure 1:
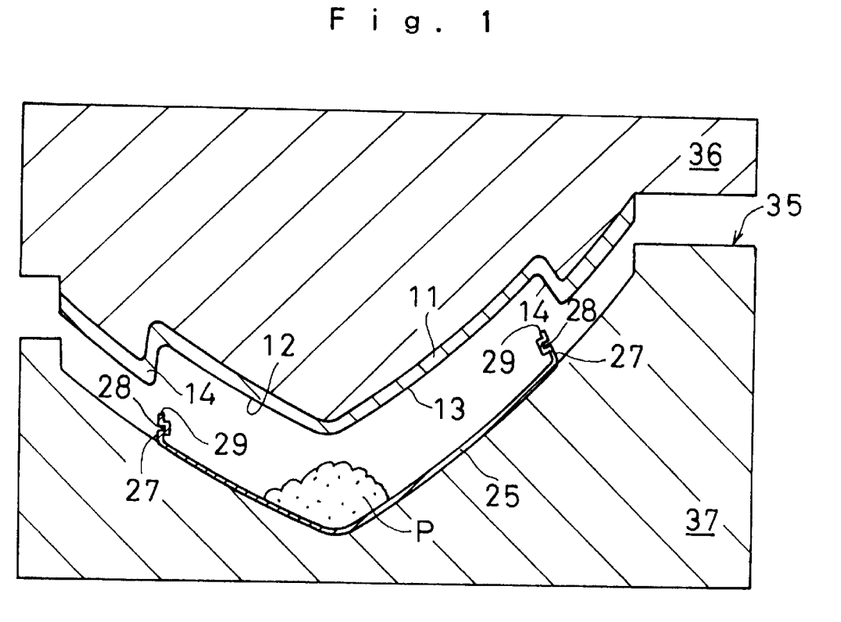
FIG. 1 is a sectional view showing a core, a skin, and foam ingredients placed on molds before closure, according to a first embodiment of the present invention.
Figure 2:
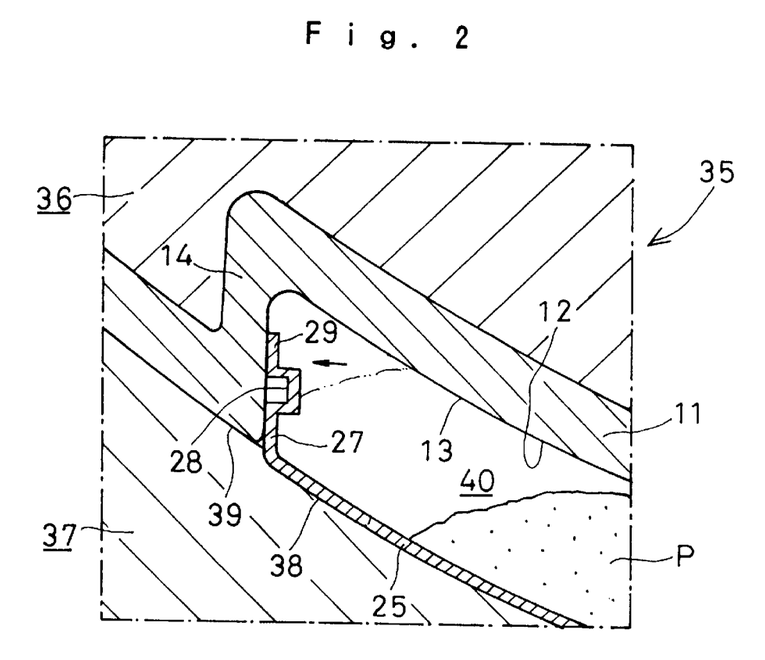
FIG. 2 is an enlarged section showing an essential part of FIG. 1 with the molds being closed and the foam ingredients rising.
Figure 3:
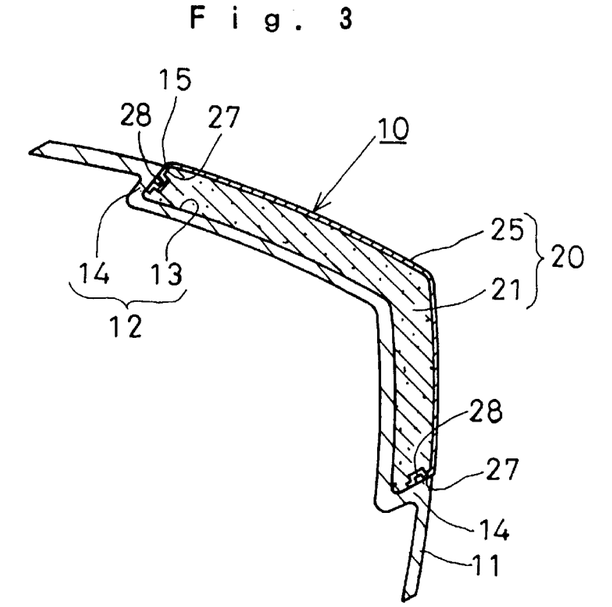
FIG. 3 is a sectional view showing a molded plastic product with a pad according to the first embodiment.

FIGS. 1 and 2 are sectional views showing a method of manufacturing a molded plastic product with a pad according to the first embodiment of the present invention, and FIG. 3 is a sectional view showing a completed figure of the product. The product 10 consists of a core 11 and the pad 20. The product 10 is manufactured with use of a mold 35. The pad 20 is composed of plastic foam 21 and a skin 25.

The core 11 is made from a rigid plastic such as acrylonitrile-butadiene-styrene (ABS) resin or polypropylene, or shape keeping plastics such as fiber-reinforced plastics. The core 11 has a pad housing 12, which consists of a pad supporting face 13 and a sidewall 14 that surrounds the supporting face 13. The pad housing 12 has proper size and shape to receive the pad 20.

Figure 4:
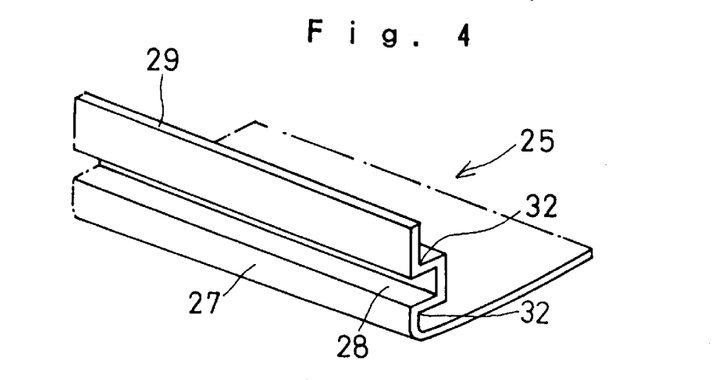
FIG. 4 is a perspective view showing an essential part of a skin according to the present invention.

The skin 25 covers the surface and side face of the plastic foam 21, has a required shape, and is made of plastic leather manufactured by vacuum molding, sol slush molding, or powder slush molding. The skin 25 has a side face 27 that is bent toward the back side of the skin 25 as shown in FIG. 4. The side face 27 is shaped to fit the pad housing 12. A groove 28 having a channel-like sectional shape is formed partly or entirely along the side face 27. The groove 28 is open on the side face 27 and is dented from the surface toward the back face of the side face 27. The groove 28 runs substantially in parallel with a free end 29 of the side face 27.

Figure 5:
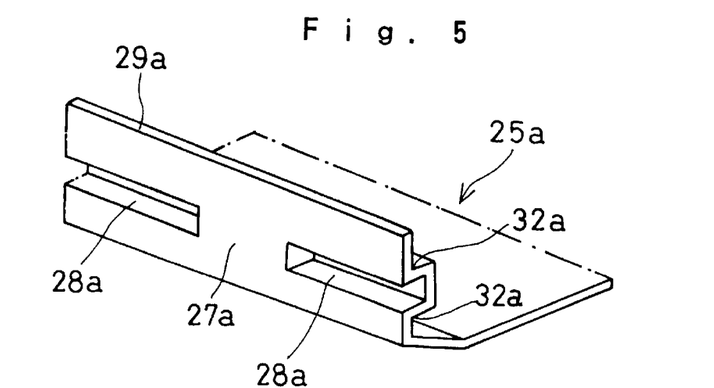
FIG. 5 is a perspective view showing an essential part of another skin according to the present invention.
Figure 6:
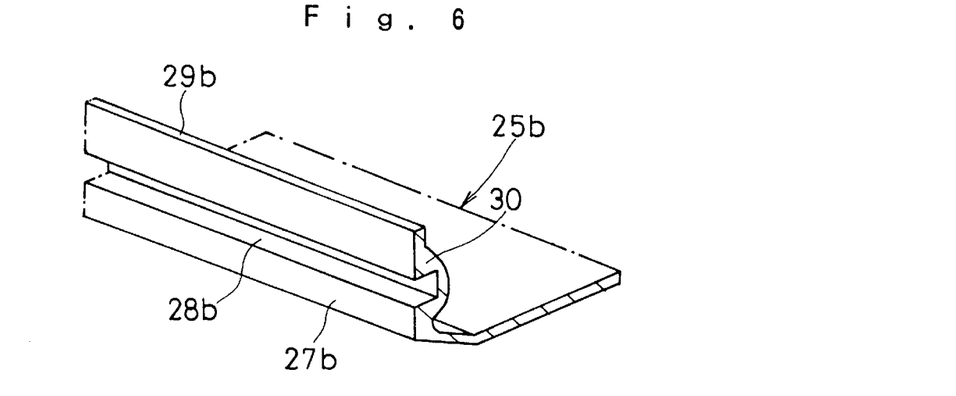
FIG. 6 is a perspective view showing an essential part of still another skin according to the present invention.

The groove 28 improves the rigidity of the side face 27. FIG. 5 shows a modified groove 28a. The groove 28a is intermittently formed along a side face 27a of a skin 25a. FIG. 6 shows another modified groove 28b. The groove 28b is formed on a side face 27b and has a thicker wall than the other part of a skin 25b. The thick part 30 of the groove 28b improves the rigidity of the side face 27b, to prevent the side face 27b from being deformed or corrugated. The skins 25 to 25b may be formed by sol or powder slush molding. Then, bases 32 and 32a of the grooves 28 and 28a may collect molten plastic material during molding, to easily form thick-wall grooves such as the groove 28b of FIG. 6. The grooves 28 to 28b are formed close to free ends 29 to 29b, to improve the rigidity of the free ends and surely prevent a corrugation of the side faces 27 to 27b. The groove 28 may have a sectional shape of 2 mm×2 mm and may be formed away from the free end 29 by 3 mm.

The core 11 is set on an upper mold 36, and the skin 25 is set on a lower mold 37.

At this time, the core 11 is set such that the back of the pad supporting face 13 faces the upper mold 36 and the front face thereof faces the lower mold 37. The upper mold 36 has pins (not shown) to hold the core 11. The skin 25 is set such that the front face thereof faces the lower mold 37 and the back face thereof faces the upper mold 36. When the upper and lower molds 36 and 37 are closed, the side face 27 of the skin 25 is received in the pad housing 12 of the core 11. To easily position the skin 25, the lower mold 37 has a skin base 38 that is stepped down from a peripheral face 39 as shown in FIG. 2. A molding cavity 40 is defined between the upper and lower molds 36 and 37.

Foam ingredients P such as urethane foam ingredients is poured onto the skin 25 on the lower mold 37, and the upper and lower molds 36 and 37 are closed. As a result, the side face 27 of the skin 25 is accommodated in the pad housing 12 of the core 11. At this time, the side face 27 is in contact with the sidewall 14 of the pad housing 12, or the free end 29 of the skin 25 is slightly away from the sidewall 14. The side face 27 is never deformed or corrugated because of the groove 28.

The foam ingredients P produces foam to fill a space in the pad housing 12 between the pad supporting face 13 and the skin 25. The foam reaches the side face 27 as indicated with a dash-and-two-dot line in FIG. 2, to push the side face 27 against the sidewall 14. This results in sealing any gap between the side face 27 and the sidewall 14, thereby preventing the foam 21 from leaking outside the skin 25. The foam 21 is self-adhesive to the skin 25 to form the pad 20 of FIG. 3. The form 21 also adheres to the core 11.

The foam ingredients P may irregularly flow and penetrate between the side face 27 and the sidewall 14. In this case, the penetrating foam is received by the groove 28 and never leaks onto the surface of the skin 25.

Thereafter, the molds 36 and 37 are opened, and the product 10 is demolded.

The product 10 is light, and no foam adheres to the surface of the skin 25, to provide a good appearance. Since the side face 27 of the skin 25 is pressed against the sidewall 14 of the pad housing 12 of the core 11, a joint 15 between the pad 20 and the core 11 has no gap, to provide a good appearance.

Figure 7:
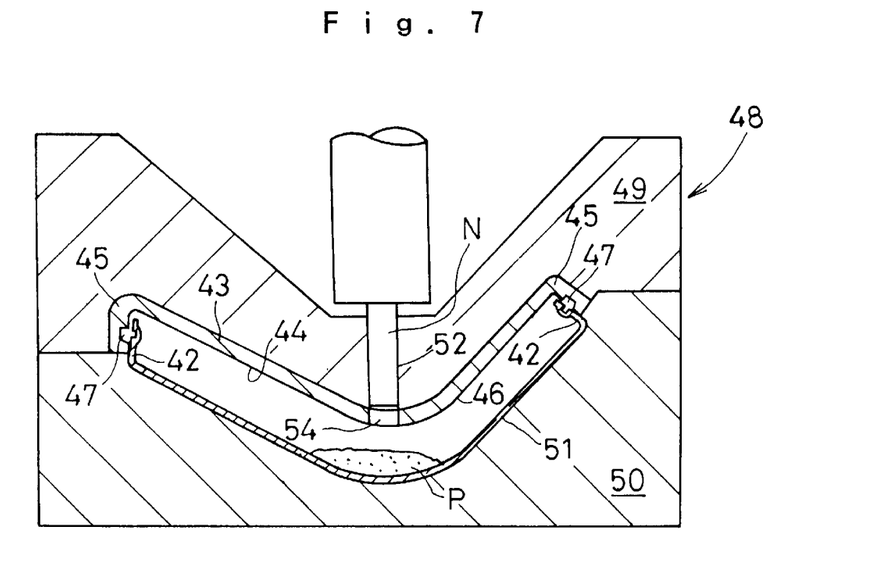
FIG. 7 is a sectional view showing molds with injected foam ingredients according to a second embodiment of the present invention.
Figure 8:
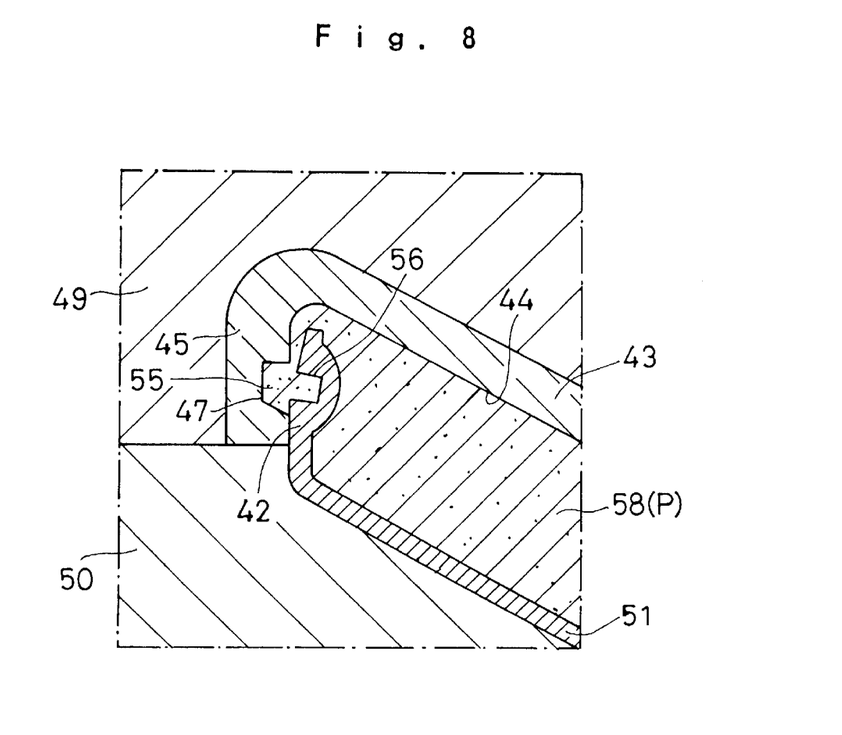
FIG. 8 is an enlarged section showing an essential part of the molds of the second embodiment with the foam ingredients risen completely.
Figure 9:
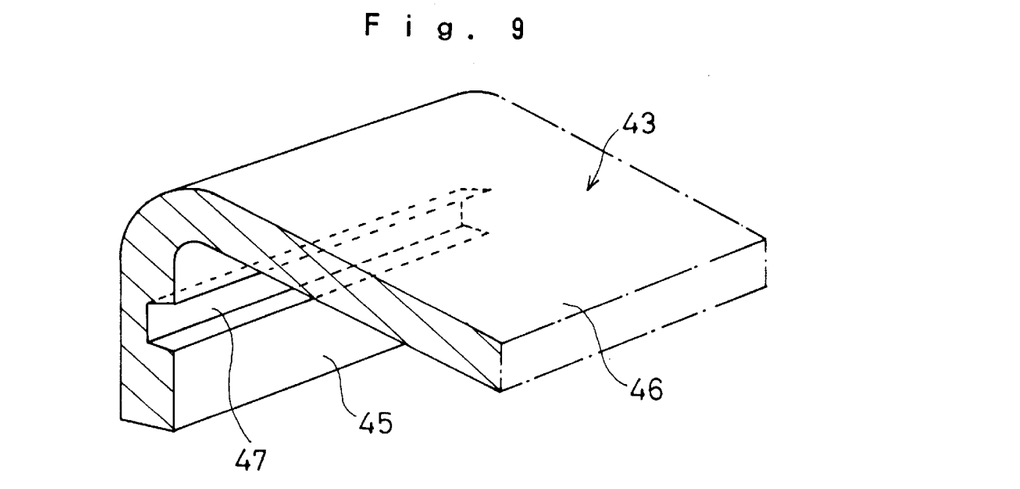
FIG. 9 is a perspective view showing an essential part of a core according to the present invention.

FIGS. 7 and 8 are sectional views showing a molded plastic product with a pad according to the second embodiment of the present invention. A skin 51 has a side face 42. A core 43 has a pad housing 44 having a sidewall 45. The side face 42 is fitted to the sidewall 45. The skin 51 has a groove 56, and the core 43 has a groove 47. The groove 47 is partly or entirely formed along the periphery of a pad supporting face 46 of the pad housing 44. The grooves 47 and 56 face each other when the skin 51 is placed in the pad housing 44. The skin 51 forms the pad that substantially covers the core 43. FIG. 9 shows a part of the core 43. A mold 48 is composed of an upper mold 49 and a lower mold 50 and is of a closed injection type. Namely, the upper and lower molds 49 and 50 are closed, and then, foam ingredients P is injected between the core 43 and the skin 51. The upper mold 49 has an injection port 52 into which an injection nozzle N of a foam apparatus is inserted. The form material P is injected into the space between the core 43 and the skin 51 through an opening 54 of the core 43. The core 43 is applicable to a pad that partly covers the core 43. The core 43 is applicable to the open injection of the first embodiment that opens the upper and lower molds, injects foam ingredients, and closes the molds.

With reference to the second embodiment similar to the first embodiment, foam ingredients filled in the skin 51 and the core 43 and generated gas push the sideface 42 of the skin 51 against the sidewall 45 of the pad housing 44, thereby sealing any gap between them. Even if a large quantity of foam ingredients penetrates between the side face 42 and the sidewall 45, the groove 47 of the sidewall 45 and the groove 56 of the side face 42 receive the penetrating foam 55, to thereby prevent the foam 55 from oozing over the surface of the skin 51. The foam 55 in the grooves 47 and 56 and the foam 58 inside the skin 51 bond and sandwich the side face 42 of the skin 51. In addition, the foam 55 in the groove 47 firmly fixes the side face 42 to the sidewall 45 of the core 43. As a result, the skin 51 hardly peels off.

The groove 47 is, for example, 3 mm×3 mm in cross-sectional size.

Figure 10:
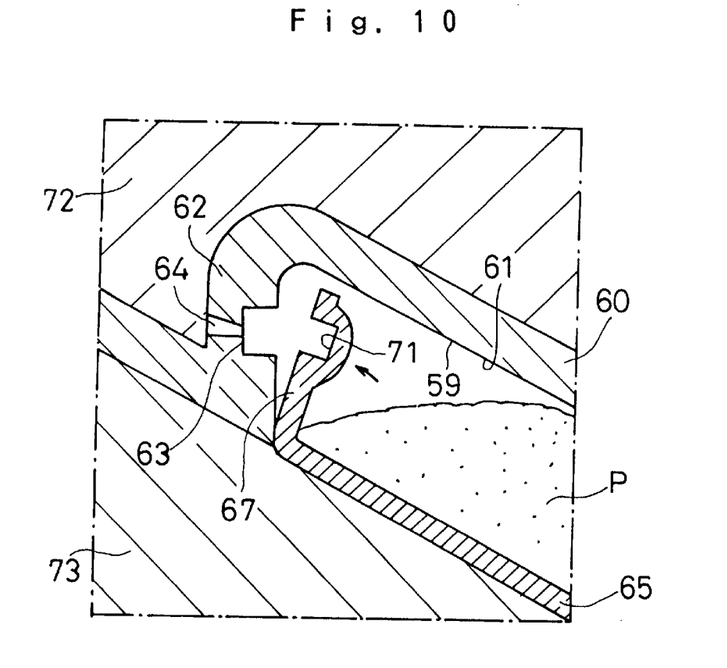
FIG. 10 is an enlarged section showing an essential part of molds with foam ingredients rising according to a third embodiment of the present invention.
Figure 11:
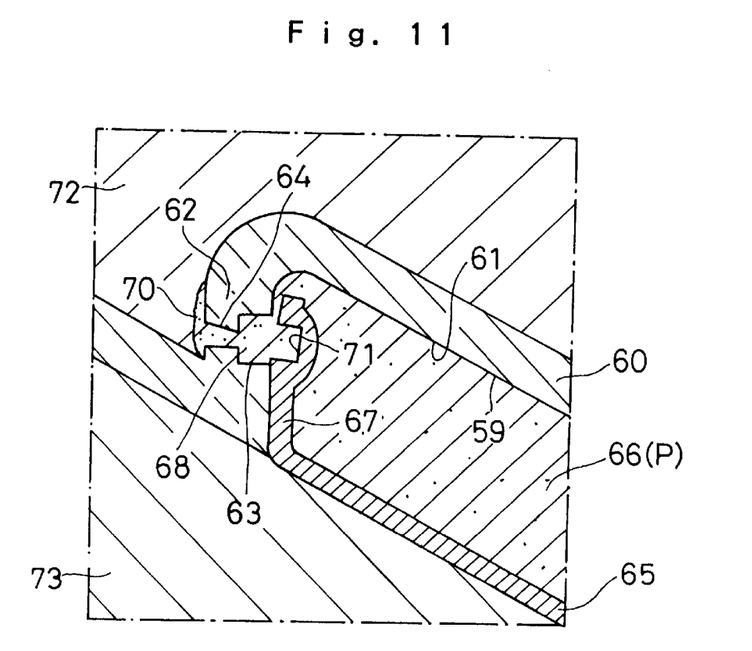
FIG. 11 is an enlarged section showing the same part as FIG. 10 with the foam ingredients risen completely.
Figure 12:
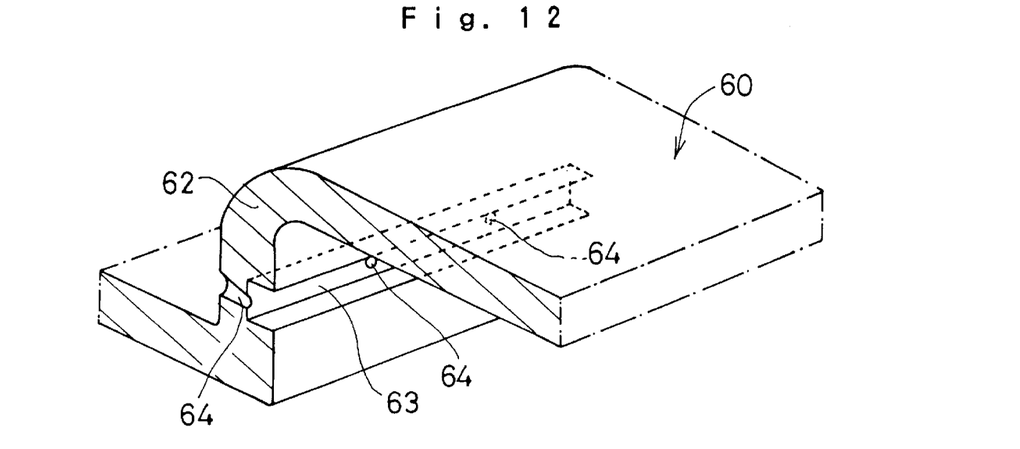
FIG. 12 is a perspective view showing an essential part of a core according to the third embodiment.

FIGS. 10 and 11 are sectional views showing a molded plastic product according to the third embodiment of the present invention. A core 60 has a pad housing 61, a sidewall 62 surrounding the pad housing 61, and a groove 63 formed on the sidewall 62. The groove 63 has through holes 64. FIG. 12 is a perspective view showing a part of the core 60. Foam ingredients 66 (P) is rised between the core 60 and a skin 65, to press a side face 67 of the skin 65 against the sidewall 62 of the pad housing 61, thereby sealing any gap between the sidewall 62 and the side face 67.

The through holes 64 communicate with the outside of the pad housing 61, to release pressure accumulated between the sidewall 62 and the side face 67. As a result, foam 68 penetrating between the sidewall 62 and the side face 67 is guided toward the through holes 64 and is surely received in the groove 63 that has the holes 64. This surely prevents the penetrating foam from leaking onto the surface of the skin 65.

If the quantity of the penetrating foam 68 is large, the excess penetrating foam 68 will flow to the back side of the core 60 through the through holes 64. Namely, the foam 68 will never leak onto the surface of the skin 65.

Foam 70 in the through holes 64 hardens to fix the foam parts 66 and 68, which are holding the side face 67 of the skin 65, to the sidewall 62 of the core 60. Namely, the side face 67 is firmly attached to the sidewall 62. Even if the skin 65 expands and shrinks during use, the side face 67 will never peel off. The through holes 65 are each, for example, 1.5 mm to 2.0 mm in diameter and are formed at intervals of, for example, 20 mm.

The core 60 has a pad supporting face 59. The side face 67 of the skin 65 has a groove 71. The product is formed between an upper mold 72 and a lower mold 73. As explained above, the present invention provides a molded plastic product having a pad with a skin whose side face has improved rigidity. The side face is hardly deformed or corrugated and provides a proper sealing function to prevent plastic foam from leaking through the side face onto the surface of the skin. As a result, the product keeps a good appearance.

Even if the plastic foam penetrates between the side face of the skin and the sidewall of a core of the product, the side face has a groove to receive the penetrating foam, thereby preventing the foam from oozing over the surface of the skin.

The sidewall of the core may have a groove, and this groove may have through holes to surely prevent the penetrating foam from oozing over the surface of the skin. This surely maintains a good appearance of the product.

Many different embodiments of the present invention may be constructed without departing from the spirit and scope of the present invention, and it should be understood that the present invention is not limited to the specific embodiments described in this specification, except as defined in the appended claims.

What is claimed is:

1. A molded plastic product comprising:

a pad and a core, the pad including a skin and plastic foam whose surface and side face are covered with the skin, the core having a pad housing for receiving the pad so that the core and pad are bonded into one body through the plastic foam, wherein a groove is formed entirely or partly along an exterior side face of the skin that faces a sidewall of the pad housing, the groove being dented in from the surface of the skin toward the interior of the plastic molded product.

2. The molded plastic product of claim 1, wherein walls of the groove are thicker than the other part of the skin.

3. The molded plastic product of claim 1, wherein the sidewall of the pad housing has a groove to face the groove of the skin.

4. The molded plastic product of claim 1, wherein the sidewall of the pad housing has a groove to face the groove of the skin and through holes formed in the groove through the sidewall of the pad housing.

5. The molded plastic product of claim 1, wherein the sidewall of the pad housing has a groove to face the groove of the skin and through holes formed in the groove through the sidewall of the pad housing, and wherein the walls of the groove of the skin are thicker than the other part of the skin.

6. A method of manufacturing a molded plastic product comprising:

providing a core having a pad supporting face, a sidewall surrounding the pad supporting face, and a pad housing defined by the pad supporting face and sidewall;

providing a skin having an exterior side face to be fitted to an interior surface of the sidewall of the core;

setting the core on a first mold so that the pad supporting face is oriented toward a second mold;

setting the skin on the second mold so that an interior surface of the skin is oriented toward the pad supporting face of the core; and activating foam ingredients between the pad supporting face of the core and the interior surface of the skin, to bond the skin and the core into one body through the foam ingredients, wherein a groove is partly or entirely formed along the exterior side face of the skin denting the surface of the exterior side face toward the interior of the molded plastic product.

7. The method of claim 6, wherein walls of the groove are thicker than the other part of the skin.

8. The method of claim 6, wherein a groove is partly or entirely formed along the sidewall of the pad housing by denting the surface of the sidewall away from the interior of the plastic molded product so that the groove on the sidewall may face the groove on the side face of the skin.

9. The method of claim 6, wherein walls of the groove on the side face of the skin are thicker than the other part of the skin; and a groove is partly or entirely formed along the sidewall of the pad housing by denting the surface of the sidewall away from the interior of the plastic molded product so that the groove on the sidewall may face the groove on the side face of the skin.

10. The method of claim 6, wherein a groove is formed partly or entirely along the sidewall of the pad housing by denting the surface of the sidewall away from the interior of the plastic molded product so that the groove on the sidewall may face the groove on the side face of the skin; and through holes are formed in the groove on the sidewall of the pad housing, to pass through the sidewall.

11. The method of claim 6, wherein walls of the groove on the side face of the skin are thicker than the other part of the skin;

a groove is formed partly or entirely along the sidewall of the pad housing by denting the surface of the sidewall away from the interior of the plastic molded product so that the groove on the sidewall may face the groove on the side face of the skin; and through holes are formed in the groove on the sidewall of the pad housing, to pass through the sidewall.

* * * * *